Figure 8:
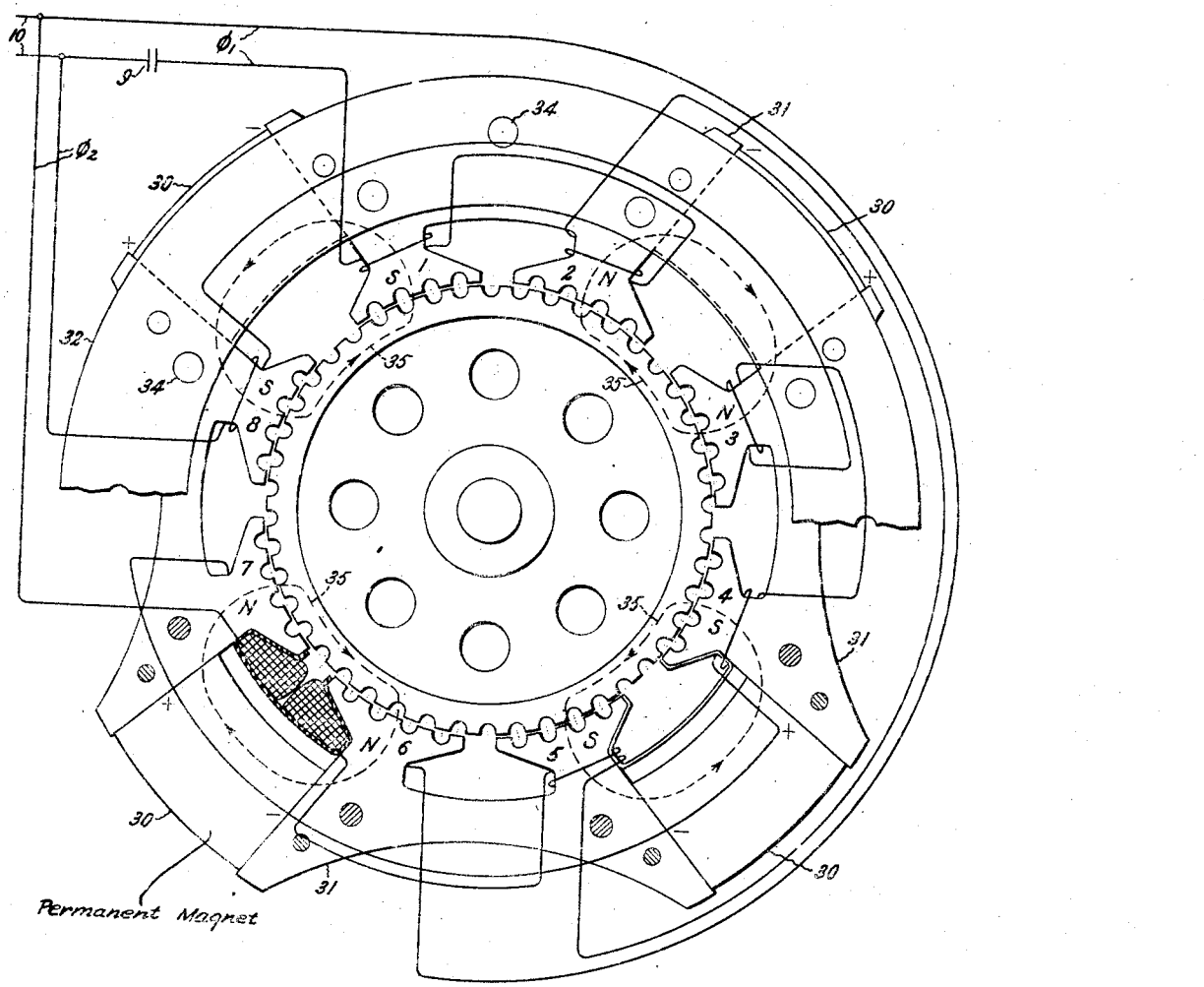

Jan. 18, 1938.                    A. F. WELCH                    2,105,513
              DIRECTIONAL SELF STARTING INDUCTOR MOTOR
                     Filed July 22, 1936           3 Sheets-Sheet 1
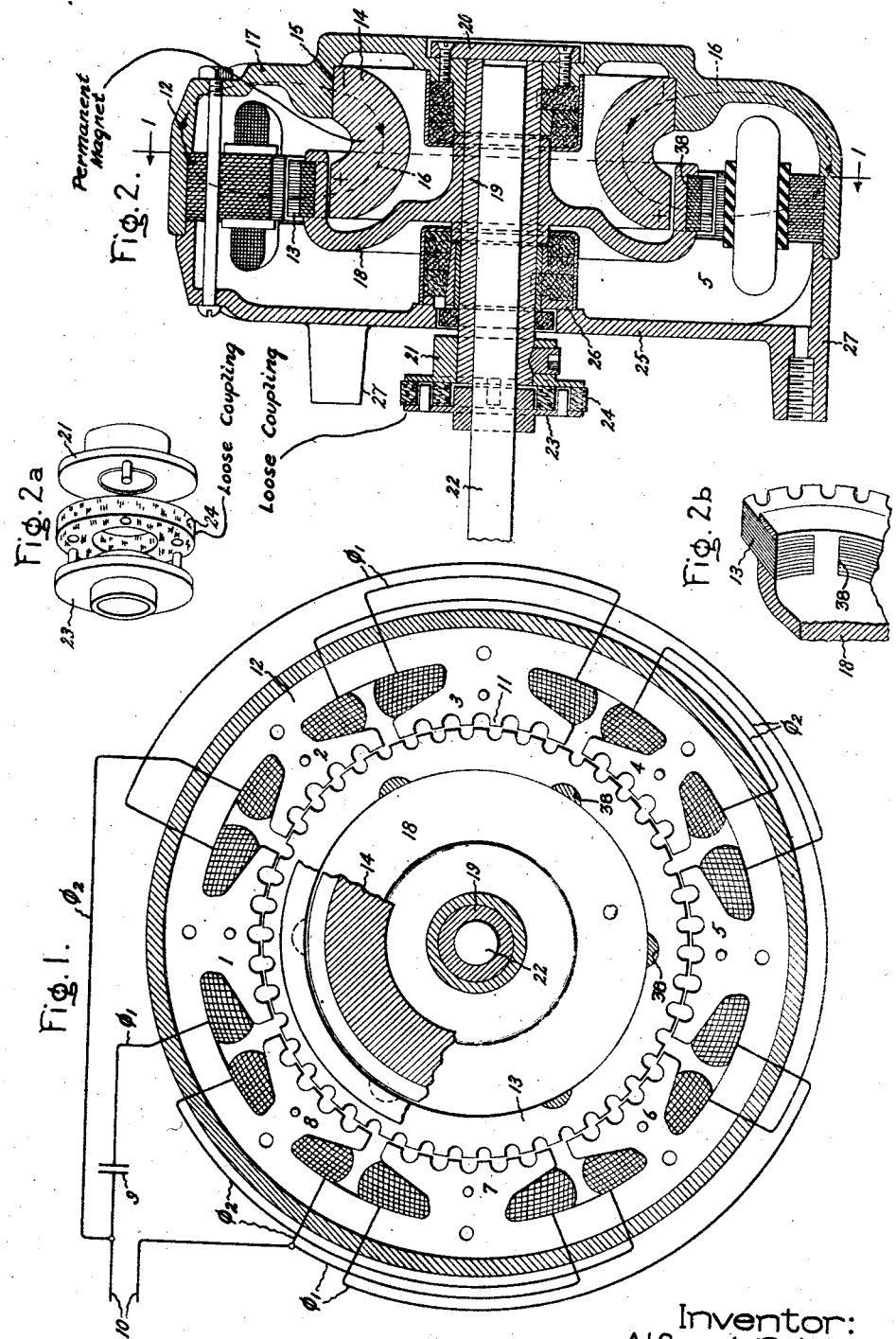
Inventor:
Alfred F. Welch,
by Harry E. Dunham
His Attorney.

Jan. 18, 1938.  A. F. WELCH  2,105,513
DIRECTIONAL SELF STARTING INDUCTOR MOTOR
Filed July 22, 1936   3 Sheets-Sheet 2
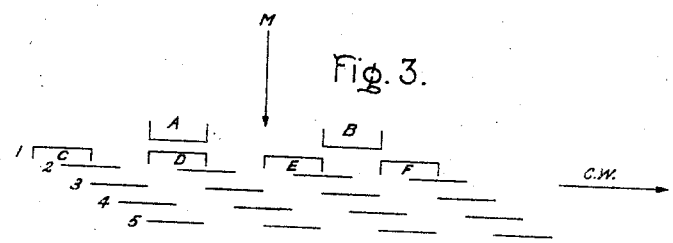
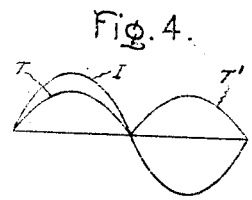
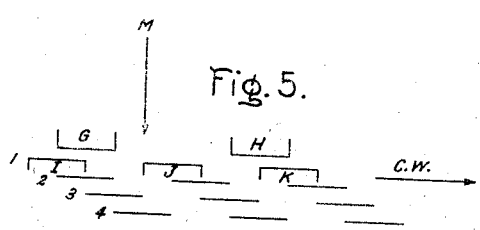
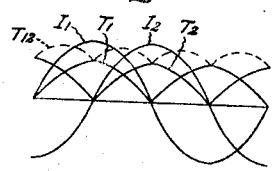
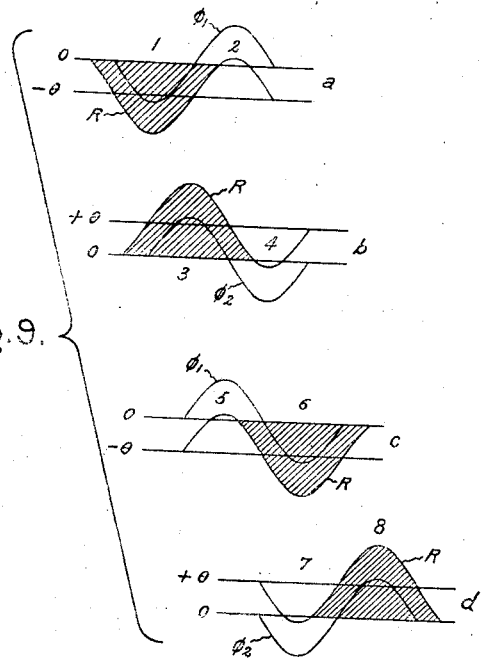
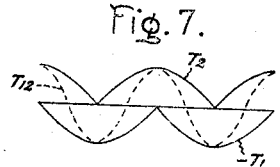
Inventor:
Alfred F. Welch,
by Harry E. Dunham
His Attorney.

Patented Jan. 18, 1938

2,105,513

UNITED STATES PATENT OFFICE 2,105,513

DIRECTIONAL SELF-STARTING INDUCTOR MOTOR

Alfred F. Welch, Fort Wayne, Ind., assignor to General Electric Company, a corporation of New York Application July 22, 1936, Serial No. 91,941

14 Claims. (Cl. 172—278)

My invention relates to synchronous inductor motors and in particular to improvements thereof which assure that the motor will be self-starting in a desired direction of rotation.

An object of my invention is to provide a compact, economical construction of such motors.

A further object of my invention is to utilize high coercive force permanent magnetic materials economically in the construction of such motors to the end that the motor shall have relatively high efficiency and power factor when built in fractional horse power sizes.

The motor of my invention is very quiet in operation and is particularly suited for the driving of timing devices, phonographs, fans, and for other purposes where a relatively slow synchronous speed or quietness of operation or both are required. However, the invention is not limited to motors of the so-called fractional horse power sizes but may be used for larger capacity motors. The main reason why it is important in the fractional horse power size of motor is because of the greatly improved efficiency which it is possible to obtain in such motors by means of the present invention.

In carrying my invention into effect, I provide a primary alternating-current winding arrangement which produces a multiphase flux or a flux having a time phase shifting component. This may be accomplished by split-phase, shading-pole, or polyphase winding arrangements. The motor also requires a unidirectional flux which may be obtained by a direct-current winding but preferably, in the smaller size motors, this is obtained by a permanent magnet or magnets.

The features of my invention which are believed to be novel and patentable will be pointed out in the claims appended hereto. For a better understanding of my invention, reference is made in the following description to the accompanying drawings in which Fig. 1 is a plan view of the stator and rotor punchings of a motor which is designed to run at 78.26 revolutions per minute on 60 cycle excitation and is, therefore, suitable for directly driving a phonograph. Fig. 1 may be considered as a view on line 1—1 of Fig. 2. Fig. 2 is a cross-sectional view through a motor, the punchings of which are shown in Fig. 1. In this arrangement, the unidirectional flux is supplied by a stationary permanent magnet extending between the stator end shield and the inner periphery of the rotor. Fig. 2a is an exploded detail view of a coupling used with the motor of Fig. 2, and Fig. 2b shows a detail of the rotor structure. Figs. 3 to 7, inclusive, are diagrams explanatory of the torque relationship for the different displacements between stator and rotor teeth in the inductor type of motor under discussion. Fig. 8 is a plan view of a motor constructed in accordance with the present invention where the unidirectional flux is provided by small permanent magnets inserted between sections of the stator. Fig. 9 is a group of curves descriptive of the flux behavior in the Fig. 8 motor. In this modification, the unidirectional excitation produces magnetic poles of reversed polarity about the stator as distinguished from the homopolar excitation used in Figs. 1 and 2, the principle of motor operation being the same, however.

Referring now in particular to Figs. 1 and 2, these figures represent a split-phase self-starting synchronous inductor motor designed with homopolar unidirectional excitation by a permanent magnet. The number and arrangement of stator and rotor teeth will produce a speed of 78.26 revolutions per minute when the split-phase field is energized at 60 cycles. It will be noted (Fig. 1) that the laminated magnetic stator 12 has eight main primary polar salients, numbered for convenience from 1 to 8, respectively, and each is provided with an alternating-current exciting coil. The coils on salients 1, 3, 5, and 7 are connected in series with a condenser 9 across the single-phase supply 10, and the coils on salients 1 and 5 are reverse to the coils on salients 3 and 7. The coils on salients 2, 4, 6, and 8 are connected in series across line 10 in parallel with the condenser circuit just described, and the coils on salients 2 and 6 are reverse to the coils on salients 4 and 8. The coils on salients 1 and 2 are wound or connected in the same direction and these two salients together thus produce a split-phase magnetic pole. Thus the stator comprises a four-pole split-phase primary motor assembly. It will be observed that the salients 1, 3, 5, and 7, on which are wound the condenser circuit coils, are slightly larger than the remaining salients wound with coils 2, 4, 6, and 8, and the condenser circuit coils are slightly heavier than the remaining coils. This is not essential, but is simply a mechanical expedient to utilize all the stator space possible and to keep the stator flux tooth density uniform.

The polar salients have the teeth 11 cut in their faces. These teeth are evenly spaced in each salient and there are six teeth in the larger salients and five teeth in the smaller salients, making a total of forty-four teeth about the stator periphery and eleven teeth in each main stator magnetic pole. The number of stator teeth is not important except that it is desirable to utilize as much as possible of the available space for the sake of economy of material and for keeping the size of the motor small for a given output. The rotor 13 contains forty-six evenly spaced teeth. The rotor tooth number determines the speed for a given frequency. Since the rotor teeth are evenly spaced, it is apparent that the stator teeth in the different stator salients do not conform to the same space relationship. Although the teeth in any one salient have the same spacing as the rotor teeth in the modification described, the stator teeth belonging to salients which differ in polarity or phase are offset from a simultaneous alignment position with respect to the rotor teeth in a direction and to the extent necessary to produce inductor motor torque as distinguished from reluctance motor torque. The displacement of the stator teeth with respect to the rotor teeth in the selected direction of rotation corresponds to the phase angle of the alternating-current fluxes of the stator teeth, where the rotor tooth spacing corresponds to a 360 degree alternating-current flux angle.

As shown in Fig. 1, the primary teeth in stator salients 1 and 5 are in alignment with the secondary rotor teeth. If the rotor is turned one-fourth tooth pitch in a clockwise direction, the teeth in salients 2 and 6 will align with the rotor teeth. A further movement of the rotor in the same direction by one-fourth tooth distance will bring the teeth in salients 3 and 7 in alignment with the rotor teeth. The teeth in salients 4 and 8 are offset another one-fourth rotor tooth pitch in the same direction. Thus it appears that, considering the stator salients 1 to 8 in a clockwise direction, the teeth therein are advanced one-fourth rotor tooth pitch as we proceed from salient to salient. The teeth in directly opposite stator salients are, therefore, in alignment with rotor teeth at the same instant. The stator and rotor toothed portions are made up of laminated magnetic material in accordance with usual practice, and it will be noted that the alternating-current flux paths are completed between the poles by the stator frame and rotor material beneath the teeth.

Considering the alternating-current flux alone, the motor as thus designed will produce no useful torque because, if we consider the salients having maximum flux at any instant, we see that they produce rotor torques which are in opposition. For example, assume that, with the rotor position represented in Fig. 1, the in-phase flux between salients 2, 6, 4, and 8 is a maximum. Salients 2 and 6 try to turn the rotor clockwise while salients 4 and 8 try to turn the rotor counterclockwise to bring the teeth into alignment. If, however, we now produce a unidirectional flux in the proper direction and amount between stator and rotor to increase the resultant flux at salients 2 and 6 and to decrease it at salients 4 and 8, there will result a useful clockwise torque at salients 2 and 6 at the instant assumed. One-fourth cycle later, the resultant of the direct-current and alternating-current fluxes will appear at salients 3 and 7 to produce a useful clockwise torque and so on, producing in effect a resultant two-pole revolving field that will produce starting torque and drive the rotor at a synchronous speed of one rotor tooth pitch per cycle or, with the forty-six rotor teeth, 78.26 revolutions per minute. The motor, therefore, requires a unidirectional flux which is obtained in any suitable manner, either by a direct-current field winding or a permanent magnet or magnets properly applied to produce the desired flux relations necessary for producing torque.

As shown in Fig. 2, the unidirectional flux is obtained by a permanent magnet 14. This magnet is of circular doughnut shape and has a U-shaped cross section, with the open extremities of the U outward and constituting the magnet poles. It is preferably stationary, has one of its pole faces press fitted into a recess 15 at one end of the stator, and is thus symmetrically magnetically connected with the stator shell. Its other pole face faces outward close to and in symmetrical alignment with the inner periphery of the rotor laminations, the two being separated by a narrow air gap of sufficient clearance to allow the rotor 13 to turn freely.

The permanent magnet is polarized as indicated so that it produces a homopolar unidirectional flux between stator and rotor, the stator 10 frame and end shield 17 being made of magnetic material to complete the flux path indicated by dotted lines 16.

The permanent magnet is preferably one of high coercive force and I prefer to use an alloy of aluminum, cobalt, nickel, and iron, such as is described in United States Patent No. 1,968,569, Ruder, July 31, 1934, for this permanent magnet.

The rotor 13 is die cast to an aluminum spider 18 of umbrella shape so as to clear the permanent magnet 14. The inner periphery of the annular rotor has several recesses 38 therethrough through which the die cast material extends. The spider is fastened to a hollow shaft 19 having a step bearing at 20. At the upper end of shaft 19 is fastened a collar 21 forming one side of a loose coupling to a drive shaft 22. The drive shaft 22 has a corresponding collar 23, and between the faces of these collars is a cork or flexible pad 24. Pins extend upward from collar 21 into the cork pad 24 and pins extend downward from collar 23 into the cork pad 24. These pins are offset and fit loosely into holes in the cork pad as indicated in Fig. 2a. Thus, I provide a relatively loose coupling between the motor shaft 19 and the drive shaft 22. I have found that a little rotational play is desirable between the motor and its load to assure positive starting in all rotor positions and this form of coupling accomplishes this purpose as well as preventing motor vibrations from being transmitted to the turntable shaft 22. The turntable shaft preferably extends downward into hollow shaft 19 an appreciable distance to prevent any wobbling of its upper end. By thus making the turntable shaft separable from the motor shaft, the turntable shaft may be changed to fit any style of turntable without requiring any change in the motor shaft structure. The end shield 25 closes the upper end of the motor and supports a suitable bearing 26 for the upper end of the rotor shaft. The end shield 25 is also provided with suitable bosses 27 with screw holes to fasten the motor to the under side of a phonograph table. It will be evident that various changes may be made in the structural details of the motor here represented, which design is intended for driving a phonograph.

A more complete description of the flux and torque relations involved in the theory of operation of the motor may be desirable and this will be attempted with the aid of Figs. 3 to 7. If this type of motor is provided with only a single-phase alternating-current exciting winding, i. e., no rotating component, it may start but, if so, it may start in either direction of rotation. I have found it necessary to provide an alternating flux having a directional rotating component in order to assure starting of the motor in a given direction of rotation. The reason why a simple alternating-current stator flux does not give direction rotation may be explained in connection with Figs. 3 and 4.

In Fig. 3, A and B represent individual teeth in the salients 1 and 3, Fig. 1, of reversed polarity it being assumed for the present that the quarter-phase salients 2, 4, etc., Fig. 1, are absent. C, D, E, and F represent rotor teeth. M represents the direction of unidirectional flux between stator and rotor. Let I, Fig. 4, be the single-phase stator current wave and assume the current to be zero when teeth A and D are in line and B is 180 degrees displaced from E as indicated. When I is positive, the alternating-current magnetomotive force is assumed to be in opposition to the direct-current magnetomotive force M at tooth A, in which case they will add at tooth B. This will result in a weak field at A and a strong field at B. If the rotor is at this instant slightly displaced to the right, there will be a pull to the right due to the difference in field strength at A and B. If, however, the rotor remains stationary in the positions shown in the line of teeth numbered 1, Fig. 3, there will be no torque in either direction regardless of the sign of the alternating-current because between A and D there is no rotational torque component while at B the torque between B and E is equal and opposite to that between B and F. In any other fixed relative position than that shown in Fig. 3, line 1, the torque will be plus or minus, varying with the instantaneous value and sign of alternating current. There will be definite alternating torque but no continuous torque in either direction.

If the rotor, Fig. 3, is assumed to move clockwise to the right in time with the alternating current wave I, Fig. 4, the rotor teeth occupying successively the positions shown at 2, 3, 4, and 5, Fig. 3, the field at A will be weakened by the opposing alternating-current magnetomotive force while at B it will be strengthened by the assisting alternating-current magnetomotive force. Since the difference in field strength at A and B is due to the sinusoidal variations of the current, the torque impulse at the rotor teeth moving from position 1 to position 3 will also be sinusoidal and will be in phase with the current. This torque may be represented by the half wave T, Fig. 4. When the rotor teeth D and E arrive at position 3, Fig. 3, their positions relative to the stator teeth are reversed and, at the same instant, the current reverses. The torque, therefore, continues in the same direction, the field at A now becoming strong and that at B becoming weak. The second torque impulse may, therefore, be indicated by T', Fig. 4. Thus, for clockwise rotation, the torque impulses continue in this manner as the rotor revolves in synchronism with the current always positive but varying from zero to maximum sinusoidally.

Keeping the same time and space relations and assuming the rotor to move to the left, a similar single-phase torque wave will be developed in the same manner but in the opposite direction. Such a motor without alternating-current rotating component will, therefore, run equally well in either direction in which it is brought in synchronism with the current and will have a definite synchronous torque.

In a copending application, Serial No. 91,942, filed concurrently herewith, I have pointed out certain very advantageous applications of such a motor which may start in either direction of rotation.

However, to make the motor start and run always in the same direction of rotation, we add the stator teeth G and H, Fig. 5, assumed to be individual stator teeth from salients 2 and 4, Fig. 1, excited so as to produce with the flux from A and B, Fig. 3, a two-phase flux in the stator. Fig. 6, $I_1$ and $I_2$ represent the two-phase currents exciting teeth A, Fig. 3, and G, Fig. 5, displaced ninety degrees in time phase. Teeth G and H are displaced ninety degrees in space displacement from those in phase 1, as explained in connection with Fig. 1.

If now with this combination, the rotor teeth move clockwise to the right, phase 1 will develop a torque as already explained, while phase 2 will develop a similar torque wave in quadrature to that of phase 1 and in the same direction. These torque waves are represented by $T_1$ and $T_2$, Fig. 6, and added together produce the torque $T_{12}$, showing a torque always positive and never less than the maximum of one phase acting alone.

If now we assume the rotor to move in the opposite direction, i. e., counterclockwise, the single-phase torque waves developed will be in time quadrature but in the opposite directions as shown in Fig. 7, the time average of which is zero. With the current phase relation as shown, the two-phase motor will, therefore, not run counterclockwise.

It is thus shown that a simple single-phase motor, Figs. 3 and 4, will develop torque in either direction of rotation regardless of alternating-current value or direction. Phase 2, Figs. 5 and 6, will also develop pulsating torque in time phase with the line frequency. Any rotor movement caused by a positive clockwise pulsation of torque in phase 2 gets immediate assistance from phase 1, while any counterclockwise movement (Fig. 7) is immediately suppressed to zero. Therefore, as the rotor oscillates at the moment of starting to increasing amplitude, it will, because of excessive positive torque, break over in the positive direction of the alternating-current field movement. The two-phase motor may be reversed by reversing either alternating-current phase or the direction of the unidirectional flux. The teeth in the stator and rotor are preferably symmetrical, that is, have the same radius at the leading and trailing tips as shown and the direction of rotation of the motor is not dependent upon the shape of the teeth.

Such a motor apparent cannot start a load having considerable inertia if the load is connected rigidly to the rotor shaft because the load then becomes a part of the rotor inertia and the initial alternating pulsations will be absorbed in inertia reaction. Thus, it appears to be necessary to provide a loose, a friction, or a yielding coupling such as shown at 21, 23, 24, Figs. 2 and 2a, between the rotor and load where the load has any appreciable inertia so that the rotor may vibrate in a rotational direction slightly in starting. Apparently, best results are obtained when the relation between the natural period of vibration of the rotor and the excitation frequency rate is such as to assist rotary vibrations of the rotor. If these precautions are given consideration, it is possible to start a load having a moment of inertia many times that of the rotor.

While a ninety degree split-phase motor has been described, it will be obvious that directional rotation may be obtained by using three-phase or shading pole flux components to produce the necessary rotating field component. The stator teeth displacements should, however, correspond closely to the time-phase displacement of the out-of-phase fluxes employed if smooth, efficient operation is to be expected. Investigations thus far carried out indicate that the value of direct-current or unidirectional flux through a tooth should be slightly less than the peak of the alternating-current flux wave therethrough for the best results, although this relationship does not appear to be at all critical.

Fig. 8 illustrates a motor with a somewhat different arrangement of the flux paths than was explained in connection with Figs. 1 and 2. In Figs. 1 and 2, the unidirectional flux was homopolar and the alternating-current polar fluxes proceeded about the stator in the same general way as in the standard rotating field alternating-current motor. In Fig. 8 the unidirectional flux is obtained by four small permanent magnets 30 inserted between pairs of stator salient sections 31 in the annular stator structure. 32 represents a continuous nonmagnetic supporting ring shown partially broken away. One such ring will be used at either end of the machine and the permanent magnet segments 30 and stator laminated contact segments 31 will be clamped between such rings by bolts on rivets 34.

In the motor represented in Fig. 8, there are eight stator polar salients, each provided with an alternating-current coil, sections of completed coils being shown between poles 6 and 7 and the remaining coils merely being indicated by loops. For convenience, these salients are numbered from 1 to 8. It will be noted that the north and south coils belonging to one phase are grouped in adjacent pairs. Thus salients 1 and 2 are south and north poles of $\phi_1$, also salients 5 and 6 are south and north poles of $\phi_1$, the coils on these salients being connected in series to phase 1 to produce the polarity indicated by S and N on the corresponding polar salients. Likewise, salients 3, 4, 7, and 8 are $\phi_2$ salients of the alternating-current polarities indicated. The four permanent magnets 30 are inserted between the $\phi_1$ and $\phi_2$ salients as shown and the polarities of these permanent magnets are indicated by plus and minus signs at their corresponding pole faces. The constant uniform direct-current flux will, therefore, travel in the general paths indicated by dotted lines 35, producing in effect four direct-current magnetic poles of alternate reverse polarity. For instance, salients 7 and 8 constitute a plus direct-current pole and salients 5 and 6 a minus direct-current pole.

The resultant of the direct-current and the alternating-current fluxes will produce a field which, acting on the rotor with the stator and rotor tooth spacing represented, will produce directional rotation; that is, the resultant field has a rotating component on the rotor although it is not so easy to visualize because the resultant field does not rotate continuously in circular space about the rotor.

In Fig. 9, I have pictured the flux relations that will exist at the different polar salients during a cycle on the assumption that the current of $\phi_1$ leads that of $\phi_2$ by ninety degrees. In the upper group of curves (a), Fig. 9, $\phi_1$ represents the alternating-current flux occurring at salients 1 and 2 when the alternating-current flux of salient 1 is negative and a maximum and that in salient 2 is positive and a maximum. The direct-current flux at these salients is negative and is represented below the zero flux line at minus θ. The resultant flux is, therefore, represented by R which shows that, at the instant assumed, the resultant power flux wave shown shaded occurs at salient 1. The positive alternating-current flux and the negative direct-current flux at salient 2 cancel approximately. This condition will of course be duplicated at salients 5 and 6.

One-fourth cycle later, the maximum alternating-current fluxes will occur at salients 3, 4, 7, and 8 and the second group of curves (b) show the flux relations at salients 3 and 4, this group being shown as shifted ninety time-phase degrees to the right with respect to the first group of curves. It is seen that the resultant power flux wave occurs at salient 3 and a corresponding power flux wave will occur at the opposite similar salient 7.

Another quarter of a cycle later, the fluxes at salients 5 and 6 will be as represented by the third group of curves (c). At this time, 180 degrees or one-half cycle after the fluxes were considered at salients 1 and 2 in the first group of curves (a), the alternating-current polarities of salients 1, 2, 5, and 6 will have reversed so that salient 5 now has a positive alternating-current flux and salient 6 a negative alternating-current flux. The resultant power flux will, therefore, occur at salient 6 and likewise at salient 2.

Another quarter of a cycle later, at which time salients 3 and 7 will have a south alternating-current polarity and salients 4 and 8 a north alternating-current polarity, the flux relations thereat will be as represented in the fourth group of curves (d) and the resultant power flux will occur at salient 8 and also at salient 4. Thus, during a cycle, power fluxes occur once at each polar salient, those in directly opposite salients occurring simultaneously.

For the position of the rotor illustrated, the power flux which occurred at salients 3 and 7 (Fig. 9b) will produce a clockwise rotational torque on the rotor which we will assume starts rotation. The power flux which occurs one-quarter cycle later at salients 6 and 2 (Fig. 9c) will also produce rotor torque in a clockwise direction because at this time the rotor teeth will have shifted out of the neutral position shown at salient 6, Fig. 8, in a lockwise direction due to the previous power flux at salients 2 and 4.

Likewise, the power fluxes at salients 8 and 4 (Fig. 9c) will produce torque in a clockwise direction because now the rotor teeth will have shifted approximately one-half tooth pitch from the position shown in Fig. 8 due to the previous power fluxes. Thus, the motor arranged here will rotate clockwise. The direction of rotation may be reversed by reversing one phase or by causing $\phi_2$ to lead $\phi_1$ by ninety degrees. It is seen that the motor of Fig. 8 does not have a resultant magnetic field which rotates uniformly in space about the circle of the air gap but nevertheless does have an effective rotating component which produces a directional rotation.

In this construction, I have employed four permanent magnet inserts, preferably of the high coercive force material previously referred to, in such a way as to give a four-path circuit for the permanent magnet flux. If we employed the usual arrangement of alternating-current magnetic circuit, we would require sixteen stator polar salients instead of the eight shown. However, by placing positive and negative alternating-current salients of a given phase adjacent to each other, two salients of one phase being on one side and the other two of the same phase being on the opposite side of the stator, I get the advantage of a four-path direct-current flux circuit without the necessity of having four alternating-current salients per direct-current pole. By this construction, I am able to employ a shallow yoke section in the rotor and in the stator the same as if it were a regular four-pole arrangement. By this construction, I am also able to reduce the radial dimensions of the permanent magnet sections over what would be required if a two-pole direct-current four-salient-per-pole arrangement were used.

In the type of motor described, the permanent magnet means produces a constant unidirectional flux between the stator and rotor of such value that the unidirectional flux materially reduces the alternating flux between stator and rotor in the stator pole pieces of one magnetic polarity and materially adds to the alternating flux between stator and rotor in the pole pieces of the opposite magnetic polarity when the alternating fluxes are substantially maximum value. The resultant flux field between stator and rotor thus has a predominating unidirectional flux field component having a pole number equal to the number of magnetic poles of one alternating flux polarity of the stator, which resultant field component moves between the stator pole pieces of opposite alternating magnetic polarity as the alternating fluxes in said pole pieces reverse in polarity. Also the relation of stator and rotor tooth spacing is such that, when the reluctance between the stator or rotor is substantially a minimum opposite the stator pole pieces of one magnetic polarity, it is substantially a maximum opposite the stator pole pieces of the opposite polarity and vice versa.

Another important matter in designing such a motor is to keep the reluctance of the unidirectional flux path constant for all rotor positions. This avoids any locking tendency due to this flux at standstill and prevents pulsations of the flux of the permanent magnet or magnets. It will be noted that this is true in both Figs. 1 and 8. Also, it will be noted that, in Figs. 2 and 8, there is no tendency for the alternating-current fluxes to flow through the permanent magnet or magnets and, consequently, there is no tendency for these magnets to become demagnetized.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. An alternating-current synchronous motor comprising co-operating, relatively rotatable, primary and secondary members, the primary member being provided with salient magnetic pole pieces, each having evenly spaced teeth therein, alternating-current winding means on the primary for producing alternating-current fluxes between different primary polar salients, the secondary having a magnetic core member with uniformly spaced teeth corresponding to the tooth spacing in the individual primary polar salients, and means for producing a unidirectional flux between primary and secondary members, the tooth relationship of primary and secondary members being such as to produce synchronous inductor motor action, said primary alternating-current winding means being arranged to produce a time-phase shift between the alternating-current fluxes at different polar salients and the teeth of such different polar salients having a mechanical phase displacement with respect to the teeth in the secondary to correspond with such time-phase flux shift to assure operation of the motor in a selected direction of rotation.

2. A polyphase alternating-current synchronous inductor motor capable of operation in a selected direction of rotation only, comprising a primary magnetic structure having a plurality of salient pole pieces, each provided with teeth in their pole faces, the teeth in different pole pieces having the same uniform spacing, alternating-current winding means on said stator for producing alternating-current fluxes in said pole pieces which differ in phase and in polarity at different pole pieces, a rotor of magnetic material having teeth in its periphery of the same spacing as the teeth in a stator pole face and separated from the stator pole faces by a narrow gap, the stator pole pieces being spaced apart such that the teeth in pole pieces of different alternating-current flux phase and polarity are offset from a simultaneous alignment position with respect to the rotor teeth in the selected direction of rotation by an amount which corresponds to the phase angle of the alternating current fluxes where the rotor tooth spacing corresponds to 360 degrees alternating-current flux angle, and means for producing a unidirectional flux between the stator and rotor of such magnitude and direction as to substantially cancel the maximum alternating-current flux of one polarity and add to the alternating-current flux of the opposite polarity at any instant, this occurring at different pole pieces at different times because of the difference in phase and polarity of the alternating-current fluxes.

3. An alternating-current synchronous motor which is self-starting in a selected direction of rotation, comprising a stator provided with salient magnetic pole pieces, winding means on said stator for producing alternating fluxes at the salient pole pieces, said salient pole pieces being divided in groups in which the alternating-current fluxes differ in phase and each such group having pole pieces of opposite alternating-current polarity, each salient stator pole piece having evenly spaced teeth in its pole face and the spacing of the teeth in different pole faces being similar, a rotor of magnetic material having evenly spaced teeth in its periphery, the tooth spacing being the same as in the individual stator salient pole pieces, and means for producing unidirectional fluxes between stator and rotor such as to largely cancel the alternating-current flux of the salient stator pole pieces of one polarity and add to the alternating-current flux of the salient stator pole pieces of the opposite polarity at the instant when such alternating-current fluxes are a maximum, the salient stator pole pieces being positioned about said rotor such that the teeth in the stator pole pieces which differ in alternating-current flux phase and polarity align substantially with the rotor teeth in synchronism with the maximum resultant flux pulsations between said teeth at any instant for one direction of rotor rotation only.

4. A two-phase inductor synchronous motor comprising a stator provided with two groups of salient stator pole pieces, a two-phase alternating-current winding on said stator for producing alternating-current fluxes differing in phase in the two groups of pole pieces, each group having an even number of north and south alternating-current poles, a magnetic rotor having an even number of evenly spaced teeth in its periphery facing the stator pole pieces, and means for producing unidirectional flux between the stator and rotor such that the maximum alternating-current stator flux which tends to penetrate the rotor at the pole pieces of one polarity is substantially neutralized and the alternating-current flux at the stator pole pieces of the opposite polarity at the same instant is added to by the unidirectional flux, this result occurring at different times at the different stator pole pieces in phase with the phase displacement and alternating polarity of the alternating-current fluxes, said stator pole pieces each having a plurality of teeth spaced the same as the rotor teeth but the stator teeth belonging to poles of different alternating-current phases or polarity being offset from a simultaneous alignment position with respect to the rotor teeth in proportion to the difference in the phase displacement and polarity of the alternating-current fluxes thereof.

5. An alternating-current synchronous inductor motor comprising a stator having a magnetic shell with inwardly projecting salient pole pieces, alternating-current winding means on said stator for producing alternating-current fluxes in the pole pieces which differ in phase and polarity at different pole pieces or pole-piece groups, an annular magnetic rotor having evenly spaced outer peripheral teeth separated from the faces of the stator pole pieces by a narrow air gap, and a stationary permanent magnet having one magnetic pole symmetrically separated from the inner periphery of the annular rotor by a narrow air gap and the other magnetic pole in symmetrical magnetic connection with the stator magnetic shell, whereby unidirectional homopolar flux excitation is supplied to said motor, the stator pole pieces each having teeth of the same spacing as the rotor teeth, the teeth in pole pieces whose alternating-current fluxes differ in phase and polarity being offset in one direction from a simultaneous alignment position with respect to the rotor teeth by an amount corresponding to the difference in phase and polarity of the alternating-current fluxes thereat, and the resultant fluxes of said motor serving to produce multi-phase synchronous inductor motor action in one direction only.

6. An alternating-current synchronous inductor motor structure comprising a stator having an annular magnetic shell, inwardly projecting magnetic toothed portions supported in said shell, an alternating-current winding on said stator, a rotor consisting of an annular magnetic member having teeth in its outer periphery cooperating with the toothed portions of the stator, said rotor being supported by an umbrella shaped nonmagnetic spider at one end of the motor, and a stationary permanent magnet of doughnut shape concentric with the axis of rotation of the rotor and having a U-shaped cross section, the open extremities of the U shape facing outward and comprising annular magnetic pole pieces of such magnet, one magnetic pole piece thereof being symmetrically separated from the inner periphery of the annular magnetic rotor by a narrow air gap and the other magnetic pole piece of said permanent magnet being symmetrically magnetically connected to the magnetic shall portion of said stator at the other end of the motor.

7. An alternating-current synchronous inductor motor which is operative in a selected direction of rotation, comprising a stator member having a plurality of inwardly projecting magnetic teeth and alternating-current winding means thereon for producing alternating-current fluxes in said teeth such that the alternating-current fluxes in different groups of teeth differ in phase and the alternating-current fluxes in the teeth of each phase group differ in alternating-current polarity at a given instant, a magnetic rotor having teeth facing the stator teeth, the teeth in the rotor being evenly spaced, and permanent magnet means for producing unidirectional flux between stator and rotor of such magnitude as to largely cancel the alternating-current flux between stator and rotor at the teeth where the maximum alternating-current flux is opposed to the unidirectional flux and to increase the resultant flux between stator and rotor at the stator teeth where the alternating-current and unidirectional fluxes add at any instant, this occurring at different stator teeth in time phase with the change in phase and polarity of the alternating-current fluxes, the stator teeth having alternating-current fluxes which differ in phase and polarity being spaced about the rotor such that, when the rotor is revolving in one direction only at a speed of one tooth pitch per alternating-current cycle, the stator and rotor teeth substantially align at all of the points where the resultant flux is a maximum.

8. An alternating-current synchronous inductor motor operable only in a selected direction of rotation, comprising a salient pole piece stator member with alternating-current winding means for producing alternating-current fluxes in the salient pole pieces which differ in polarity and in phase at different pole pieces, evenly spaced teeth in each pole piece, the tooth spacing in different pole pieces being similar, a rotor of magnetic material having evenly spaced teeth in its periphery, the tooth spacing being the same as in a stator pole piece, and means for producing unidirectional flux between stator and rotor of such magnitude as to substantially cancel the alternating-current flux of the stator pole pieces at the instant when the alternating-current flux therein is at a maximum in one direction, this instant occurring at different times at different stator pole pieces because of the difference of phase and change in polarity of the alternating-current fluxes, said stator pole pieces being spaced about the rotor such that the resultant fluxes between stator and rotor produce effective torque in one direction of rotation only and such that the reluctance between stator and rotor with respect to the unidirectional flux is substantially constant in all rotor positions.

9. A two-phase alternating-current inductor motor stator structure of annular shape made up of a plurality of connecting segments, alternate segments comprising permanent magnets and the remaining segments each comprising a laminated magnetic structure having a pair of inwardly projecting pole pieces, there being an even number of segments of each type, alternating-current windings energizing the inwardly projecting pole pieces, the windings on alternate laminated segments being connected in series for energization from one alternating-current phase to give reversed alternating-current polarity to the pair of pole pieces on such segments and the windings on the remaining laminated segments being similarly connected in series for energization from a different alternating-current phase, the permanent magnet segments being arranged to produce direct-current fluxes of the same polarity in both pole pieces of a pair, and means for securing said sectors in said relationship.

10. A two-phase inductor motor comprising an annular stator structure made up of connected segments, alternate segments comprising permanent magnets and the remaining segments comprising laminated magnetic material each having a pair of inwardly projecting pole pieces, there being an even number of segments of each type, the magnetic poles of the permanent magnets abutting against the laminated segments to produce the same direct-current polarity in the inwardly projecting pole pieces of a pair of the laminated segments, alternating-current winding means on the stator for producing alternating-current fluxes of reversed polarity in the pole pieces of each pair and out-of-phase alternating-current fluxes in the pole pieces of alternate pairs, a rotor of magnetic material having a plurality of evenly spaced teeth separated from the inwardly projecting pole pieces of the stator by a narrow air gap, and teeth provided in the face of each stator pole piece having the same spacing as the rotor teeth, the teeth in the stator pole pieces being offset from simultaneous alignment position with respect to rotor teeth in the same direction by an amount corresponding to the phase angle of their alternating-current fluxes, the rotor toth spacing corresponding to 360 alternating-current flux phase angle degrees.

11. An alternating-current synchronous inductor motor capable of operation in a selected direction of rotation only, comprising a stator of magnetic material with alternating-current winding means thereon for producing a multiphase alternating-current flux in said stator, a rotor of magnetic material co-operating with said stator and having evenly spaced salient pole portions in its periphery, each such pole portion being symmetrical with respect to its leading and trailing tips, and means for producing a unidirectional flux between stator and rotor which combines with the multiphase alternating-current field of the stator to produce a resultant rotating magnetic field component between stator and rotor effective to produce torque in one direction of rotation only and synchronous inductor motor action at a speed where the rotor moves the distance of the salient pole portion spacing per alternating-current flux cycle, said motor having a substantially uniform air gap reluctance between stator and rotor with respect to the unidirectional flux in all rotor positions, whereby said flux produces no appreciable locking torque at standstill.

12. An alternating-current synchronous inductor motor comprising a stator of magnetic material with alternating-current winding means thereon for producing a multiphase alternating flux in said stator, said stator having salient pole pieces with a plurality of evenly spaced teeth in each pole piece, a rotor of magnetic material having evenly spaced teeth in its periphery, said teeth cooperating with the teeth in the salient pole pieces of the stator, the teeth in both stator and rotor being symmetrical with regard to their leading and trailing pole tips, and means for producing a constant unidirectional flux between stator and rotor which combines with the multiphase alternating flux field of the stator to produce a resultant magnetic field component between stator and rotor effective to produce torque in one direction of rotation only, which direction is dependent upon the direction of such rotating field component and synchronous inductor motor operation at a speed where the rotor moves the distance of one rotor tooth pitch per flux cycle, said motor having a substantially uniform air gap reluctance between the stator and rotor with respect to the unidirectional flux in all rotor positions whereby said flux produces no appreciable blocking torque at standstill.

13. A synchronous inductor motor comprising cooperating stator and rotor elements, the stator being provided with an even number of salient magnetic pole pieces each having a plurality of evenly spaced symmetrical teeth in its face, an alternating-current winding on such stator for producing alternating fluxes of opposite magnetic polarity at different pole pieces, a magnetic rotor cooperating with said stator having evenly spaced symmetrical teeth in its periphery cooperating with the teeth in the pole pieces of the stator, the relation of stator and rotor tooth spacing being such that, when the reluctance between stator and rotor is substantially a minimum opposite the stator pole pieces of one magnetic polarity, it is substantially a maximum opposite the stator pole pieces of the opposite magnetic polarity and vice versa, and permanent magnet means for producing a constant unidirectional flux between stator and rotor of such value that the unidirectional flux materially reduces the alternating flux between stator and rotor in the pole pieces of one magnetic polarity and materially adds to the alternating flux between stator and rotor in the stator pole pieces of opposite magnetic polarity when the alternating fluxes are at substantially maximum value, whereby the resultant flux field between stator and rotor has a predetermined pulsating unidirectional flux field component having a pole number equal to the pole number of the stator magnetic poles of one alternating flux polarity, which resultant field component moves between stator pole pieces of opposite alternating magnetic polarity as the alternating fluxes in the said pole pieces reverse in polarity.

14. An alternating-current synchronous inductor motor structure comprising stator and rotor elements, the stator having a magnetic supporting structure with salient poles and each pole having a plurality of evenly spaced inwardly projecting teeth, an alternating-current winding on the stator, the rotor consisting of an annular magnetic member having evenly spaced teeth in its outer periphery cooperating with the teeth in the stator, said rotor being supported by an umbrella-shaped nonmagnetic spider at one end of the motor, and a stationary magnetic structure symmetrically connected to the magnetic supporting structure of the stator and extending inwardly towards the axis of rotation of the motor at the other end of the motor and then inwardly into the umbrella cavity of the rotor and providing a continuous annular pole facing the inner periphery of the annular magnetic member of the rotor and separated therefrom by a narrow air gap, said stationary magnetic structure including an annular permanent magnet polarized to produce a homopolar flux between stator and rotor.

ALFRED F. WELCH.

CERTIFICATE OF CORRECTION.

Patent No. 2,105,513.                           January 18, 1938.

ALFRED F. WELCH.

It is hereby certified that error appears in the printed specification of the above numbered patent requiring correction as follows: Page 4, second column, line 43, for "lockwise" read clockwise; page 6, first column, line 70, claim 6, for the word "shall" read shell; page 7, first column, line 29, claim 10, for "toth" read tooth; and that the said Letters Patent should be read with these corrections therein that the same may conform to the record of the case in the Patent Office.

Signed and sealed this 1st day of March, A. D. 1938.

(Seal)                                              Henry Van Arsdale,
Acting Commissioner of Patents.